(12) United States Patent
Markle

(10) Patent No.: US 8,404,012 B1
(45) Date of Patent: Mar. 26, 2013

(54) AIR FILTER FOR A VEHICLE ENGINE

(76) Inventor: Roy C. Markle, Cochise, AZ (US)

( * ) Notice: Subject to any disclaimer, the term of this patent is extended or adjusted under 35 U.S.C. 154(b) by 0 days.

(21) Appl. No.: 13/277,319

(22) Filed: Oct. 20, 2011

Related U.S. Application Data

(60) Provisional application No. 61/493,652, filed on Jun. 6, 2011.

(51) Int. Cl.
*B01D 50/00* (2006.01)
(52) U.S. Cl. ............... 55/337; 55/345; 55/346; 55/349; 55/385.3; 55/429; 55/459.1; 55/410; 55/413; 55/425
(58) Field of Classification Search ............... 55/337, 55/345, 346, 349, 385.3, 428, 429, 459.1
See application file for complete search history.

(56) References Cited

U.S. PATENT DOCUMENTS

| 3,385,034 | A | * | 5/1968 | Farr | 55/337 |
| 2010/0064643 | A1 | * | 3/2010 | Greif | 55/321 |

* cited by examiner

*Primary Examiner* — Jason M Greene
*Assistant Examiner* — Dung H Bui
(74) *Attorney, Agent, or Firm* — Kenneth L Tolar

(57) ABSTRACT

An improved vehicle air filter includes a cylindrical housing having a continuous outer wall, a releasable bottom wall and an open top in communication with an interior air-delivery chamber. Circumferentially disposed about the outer wall are a plurality of conical air-intake tubes, each having an inlet opening in fluid communication with a hollow interior. The lower end of each tube is positioned immediately above a collection pan formed on the releasable bottom wall. An arcuate air conduit extends from the upper end of each tube to the air-delivery chamber. As air enters each tube, it flows along a cyclonic path to force entrained particles against the interior surface of the tube and downwardly into the collection pan. Meanwhile, the purified air flows upwardly through the air conduits and into the air-delivery chamber for distribution to the vehicle engine.

8 Claims, 1 Drawing Sheet

AIR FILTER FOR A VEHICLE ENGINE

CROSS REFERENCE TO RELATED APPLICATIONS

This application is entitled to the benefit of provisional application no. 61/493,652 filed on Jun. 6, 2011.

BACKGROUND OF THE INVENTION

The present invention relates to an improved filter for a vehicle engine.

DESCRIPTION OF THE PRIOR ART

Typical combustion engines intake air from the atmosphere, which is filtered and delivered to the cylinders to form an explosive mixture of air and gasoline therein. Conventional engine filters are formed of a membrane that traps particles and debris from incoming air. However, as particles accumulate on the membrane, airflow gradually decreases, which significantly reduces engine efficiency. Accordingly, there is currently a need for an air filter that overcomes the above-described problems. The present invention addresses this need by providing an air filter having a plurality of conical air-intake tubes that create a centrifugal force as air flows therein to deposit particles into an underlying collection pan.

SUMMARY OF THE INVENTION

An improved vehicle air filter includes a cylindrical housing having a continuous outer wall, a releasable bottom wall and an open top in communication with an interior air-delivery chamber. Circumferentially disposed about the outer wall are a plurality of conical air-intake tubes, each having an inlet opening in fluid communication with a hollow interior. The lower end of each tube is positioned immediately above a collection chamber formed on the releasable bottom wall. An arcuate air conduit extends from the upper end of each tube to the air-delivery chamber. As air enters each tube, it flows along a cyclonic path to force entrained particles against the interior surface of the tube and downwardly into the collection pan. Meanwhile, the purified air flows upwardly through the air conduits and into the air-delivery chamber for distribution to the vehicle engine.

It is therefore an object of the present invention to provide an improved air filter for a vehicle engine.

It is another object of the present invention to provide an air filter for a vehicle that generates a centrifugal force to remove entrained particles from incoming combustion air.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
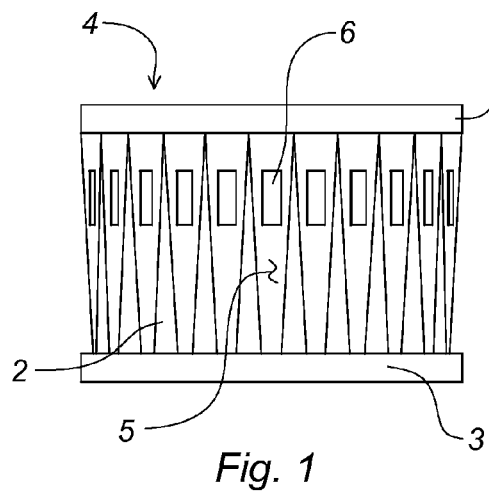
FIG. 1 is a side, plan view of the air filter according to the present invention.
Figure 2:
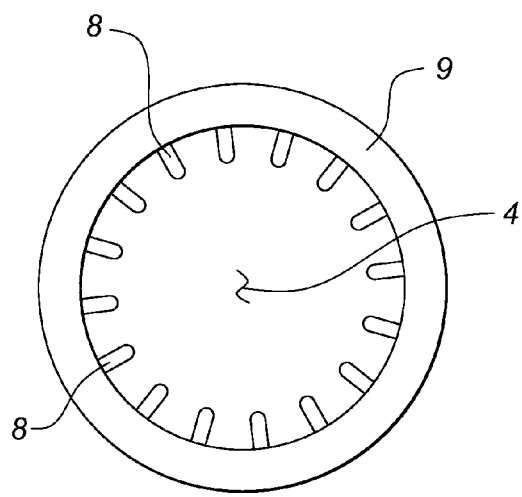
FIG. 2 is a top view of the air filter.
Figure 3:
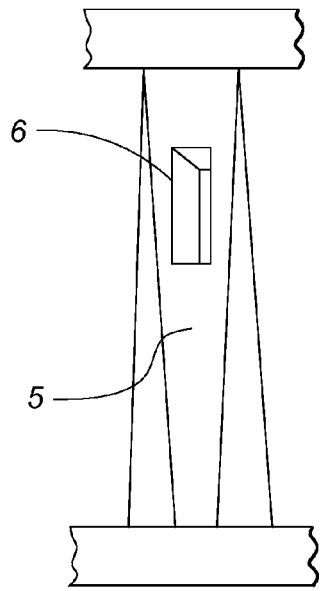
FIG. 3 is a detailed view of an exemplary air intake tube.
Figure 4:
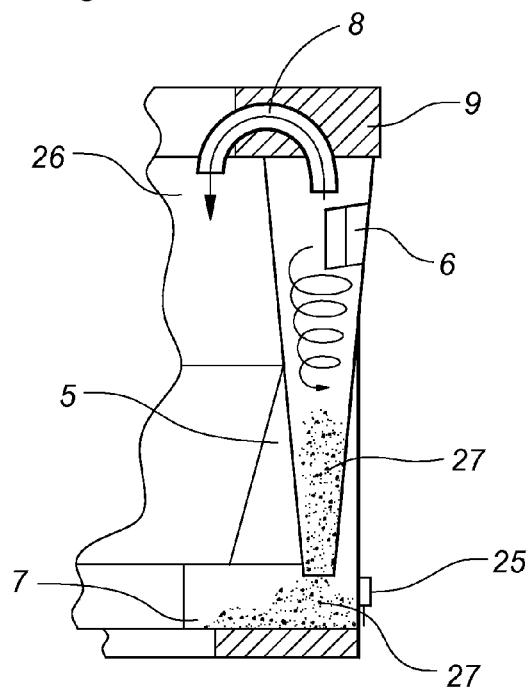
FIG. 4 is a sectional view of an air intake tube depicting air and particles being separated.

The present invention relates to an improved air filter comprising a cylindrical housing 1 having a continuous outer wall 2, a releasable bottom wall 3 and an open top 4 in communication with an interior air-delivery chamber 26. The housing is dimensioned and configured to properly fit within the existing filter-retention compartment on a given vehicle. Accordingly, the open upper end includes a foam border 9 for hermetically sealing against the filter-retention compartment when properly installed therein. The bottom wall 3 is securable to the outer wall 2 with an over-center clamping mechanism 25 or similar equivalent.

Circumferentially disposed about the outer wall are a plurality of conical air-intake tubes 5, each having an inlet opening 6 in fluid communication with a hollow interior. The lower end of each tube is positioned immediately above a collection pan 7 resting on the releasable bottom wall. An arcuate air conduit 8 extends from the upper end of each tube to the air-delivery chamber.

To use the above-described filter, a mechanic or vehicle owner removes the existing air filter and installs the housing within the filter compartment. As air enters each tube, it flows along a cyclonic path to force entrained particles 27 against the inner surface of the tube where they slide downwardly into the collection pan. Meanwhile, the purified air flows upwardly through the air conduits and into the air-delivery chamber for distribution to the vehicle engine. Periodically, the filter is removed, the collection pan is emptied and the filter is reinstalled within the filter-retention compartment.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An improved air filter for a vehicle engine comprising:
   a housing having an outer wall and an open top in communication with an interior air-delivery chamber;
   at least one conical air intake tube on said outer wall, said tube having an air inlet in fluid communication with a hollow interior and an outlet in fluid communication with said air-delivery chamber whereby combustion air entering said tube flows along a cyclonic path to force entrained particles downwardly while purified air flows upwardly to the air-delivery chamber for distribution to the vehicle engine.

2. The filter according to claim 1 wherein said housing further includes a releasable bottom wall having a collection pan thereon for receiving said entrained particles.

3. The filter according to claim 1 further comprising an arcuate air conduit extending from an upper end of said tube to the air-delivery chamber for establishing fluid communication therebetween.

4. The filter according to claim 1 wherein said open top includes a foam border for hermetically sealing against an existing vehicle engine filter compartment.

5. An improved air filter for a vehicle engine comprising:
   a housing having an outer wall and an open top in communication with an interior air-delivery chamber;
   a plurality of air intake tubes circumferentially-positioned on said outer wall, said tubes each having an air inlet in fluid communication with a hollow interior and an outlet in fluid communication with said air-delivery chamber whereby combustion air entering said tubes flows along a cyclonic path to force entrained particles downwardly while purified air flows upwardly to the air-delivery chamber for distribution to the vehicle engine.

6. In combination with a combustion engine having a filter-retention compartment, an improved air filter for a vehicle engine comprising:
   a housing received within said filter-retention compartment, said housing having an outer wall and an open top in communication with an interior air-delivery chamber;
   a plurality of air intake tubes circumferentially-positioned on said outer wall, said tubes each having an air inlet in fluid communication with a hollow interior and an outlet in fluid communication with said air-delivery chamber whereby combustion air entering said tubes flows along a cyclonic path to force entrained particles downwardly while purified air flows upwardly to the air-delivery chamber for distribution to the vehicle engine.

7. The filter according to claim 6 further comprising an arcuate air conduit extending from an upper end of each of said tubes to the air-delivery chamber for establishing fluid communication therebetween.

8. The filter according to claim 7 wherein said housing further includes a releasable bottom wall having a collection pan thereon for receiving said entrained particles.

\* \* \* \* \*